(12) United States Patent
Gordon et al.

(10) Patent No.: US 8,898,752 B2
(45) Date of Patent: Nov. 25, 2014

(54) EFFICIENTLY THROTTLING USER AUTHENTICATION

(75) Inventors: Ariel Gordon, Kirkland, WA (US); Richard Allen Lundeen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 13/364,221

(22) Filed: Feb. 1, 2012

(65) Prior Publication Data

US 2013/0198819 A1    Aug. 1, 2013

(51) Int. Cl.
*G06F 7/04* (2006.01)
*H04W 12/06* (2009.01)
*H04W 12/08* (2009.01)
*H04L 29/06* (2006.01)
*G06F 21/31* (2013.01)

(52) U.S. Cl.
CPC .............. *H04L 63/08* (2013.01); *H04W 12/06* (2013.01); *H04W 12/08* (2013.01); *H04L 63/10* (2013.01); *G06F 21/31* (2013.01)
USPC ............ 726/5; 726/2; 726/3; 726/7; 709/225; 709/229; 455/410; 455/411

(58) Field of Classification Search
None
See application file for complete search history.

(56) References Cited

U.S. PATENT DOCUMENTS

| | | | |
|---|---|---|---|
| 5,838,903 | A | 11/1998 | Blakely et al. |
| 7,840,993 | B2 | 11/2010 | Ganesan et al. |
| 8,312,073 | B2 * | 11/2012 | Jakobsson ..................... 709/201 |
| 2005/0266798 | A1 | 12/2005 | Moloney et al. |
| 2006/0253420 | A1 | 11/2006 | Hinton et al. |
| 2006/0259760 | A1 * | 11/2006 | Ahluwalia et al. ............ 713/153 |
| 2008/0184346 | A1 * | 7/2008 | Pinkas et al. ...................... 726/5 |

(Continued)

FOREIGN PATENT DOCUMENTS

| | | |
|---|---|---|
| JP | 11143834 | 5/1999 |
| KR | 20020091024 | 12/2002 |

(Continued)

OTHER PUBLICATIONS

Leto, Jonathan. "LDAP Server Return Codes." Leto.net. N.p., Jan. 21, 2010. Web. Mar. 27, 2013. <http://web.archive.org/web/20100121152444/http://leto.net/docs/ldap_error_code.php>.*

(Continued)

*Primary Examiner* — Aravind Moorthy
*Assistant Examiner* — Jason Plotkin
(74) *Attorney, Agent, or Firm* — Ben Tabor; Sade Fashokun; Micky Minhas

(57) ABSTRACT

In an embodiment, an administrative computer system receives user login credentials from a user and makes at least one of the following determinations: that the user identifier does not match any existing user account, that the user identifier matches at least one existing user account, but that the user's account is in a locked state, or that the user identifier matches at least one existing user account, but the user's password does not match the user identifier. The administrative computer system then returns to the user the same response message regardless of which determination is made. The response indicates that the user's login credentials are invalid. The response also prevents the user from determining which of the credentials was invalid, as the response message is the same for each determination and is sent to the user after a measured response time that is the same for each determination.

17 Claims, 4 Drawing Sheets

(56) References Cited

U.S. PATENT DOCUMENTS

| | | | |
|---|---|---|---|
| 2009/0019533 A1* | 1/2009 | Hazlewood et al. | 726/5 |
| 2009/0178105 A1* | 7/2009 | Feng et al. | 726/1 |
| 2009/0210712 A1 | 8/2009 | Fort | |
| 2011/0106802 A1 | 5/2011 | Pinkney et al. | |
| 2011/0197266 A1 | 8/2011 | Chu et al. | |
| 2011/0321146 A1* | 12/2011 | Vernon et al. | 726/7 |
| 2012/0304306 A1* | 11/2012 | Chamarty et al. | 726/28 |

FOREIGN PATENT DOCUMENTS

| | | |
|---|---|---|
| KR | 20030016073 | 2/2003 |
| KR | 20100102026 | 9/2010 |
| KR | 20110030045 | 3/2011 |

OTHER PUBLICATIONS

"Web Storage," Wikipedia, The Free Encyclopedia. Wikimedia Foundation, Inc. Aug. 6, 2011. Web. Apr. 1, 2013.*

Lightweight Directory Access Protocol. (Jan. 17, 2012). In Wikipedia, The Free Encyclopedia. Retrieved Aug. 12, 2013, from http://en.wikipedia.org/w/index.php?title=Lightweight_Directory_Access_Protocol&oldid=471866258.*

Lightweight Directory Access Protocol. (Jan. 17, 2012). In Wikipedia, The Free Encyclopedia. Retrieved Aug. 12, 2013, from http://en.wikipedia.org/w/index.php?title=LightweightDirectory-Access-Protocol&oldid=471866258.*

Mazieres, et al., "Separating Key Management from File System Security", In Proceedings of 17th ACM Symposium on Operating Systems Principles, Dec. 12-15, 1999, pp. 124-139.

* cited by examiner

EFFICIENTLY THROTTLING USER AUTHENTICATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, internet browsers allow users to send requests to other computer systems. These requests are answered by data servers, whose responses are transmitted over the internet back to the user. In many cases, websites provide and/or tailor their offerings to users that have been authenticated by the website. Users typically authenticate by entering some form of user name (possibly an email address) and a password or pass phrase. If the user enters the wrong credentials, login is prevented and an error message is returned.

To prevent illegitimate users from guessing or using dictionary attacks or other means of repeatedly trying passwords, throttles are implemented. These typically limit the user (or a particular internet protocol (IP) address) to a certain number of failed logins within a period of time (e.g. three failed login attempts within ten minutes). CAPTCHAS (Completely Automated Public Turing tests to tell Computers and Humans Apart) may also be used to prevent scripts or other automated systems from repeatedly guessing user name and password combinations. The CAPTCHAS require the user to view a partially distorted image and enter the word or sequence of characters displayed in the image. CAPTCHAS are designed to be easily decipherable by a human, but very difficult to decipher for a computer system.

BRIEF SUMMARY

Embodiments described herein are directed to efficiently authenticating users while preventing enumeration attacks and to providing login error messages while preventing enumeration attacks. In one embodiment, an administrative computer system receives user login credentials from a user. These user login credentials may include a user identifier and a password. The administrative computer system then makes at least one of the following determinations: it determines that the user identifier does not match any existing user account, determines that the user identifier matches at least one existing user account, but that the user's account is in a locked state, or determines that the user identifier matches at least one existing user account, but the user's password does not match the user identifier. The administrative computer system then returns to the user the same response message regardless of which determination is made. The response indicates that the user's login credentials are invalid. The response also prevents the user from determining which of the credentials was invalid, as the response message is the same for each determination and is sent to the user after a measured response time that is the same for each determination In another embodiment, a client computer system sends user login credentials from a user to an authentication server. The user login credentials include a user identifier and a password. The authentication server makes at least one of the following determinations: it determines that the user identifier does not match any existing user account, determines that the user identifier matches at least one existing user account, but that the user's account is in a locked state, or determines that the user identifier matches at least one existing user account, but the user's password does not match the user identifier. The client computer system then receives a response message from the authentication server indicating that the user's credentials are invalid. The response message prevents the user from determining which of the credentials was invalid, as the response message is the same for each determination and is received by the user after a measured response time that is the same for each determination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
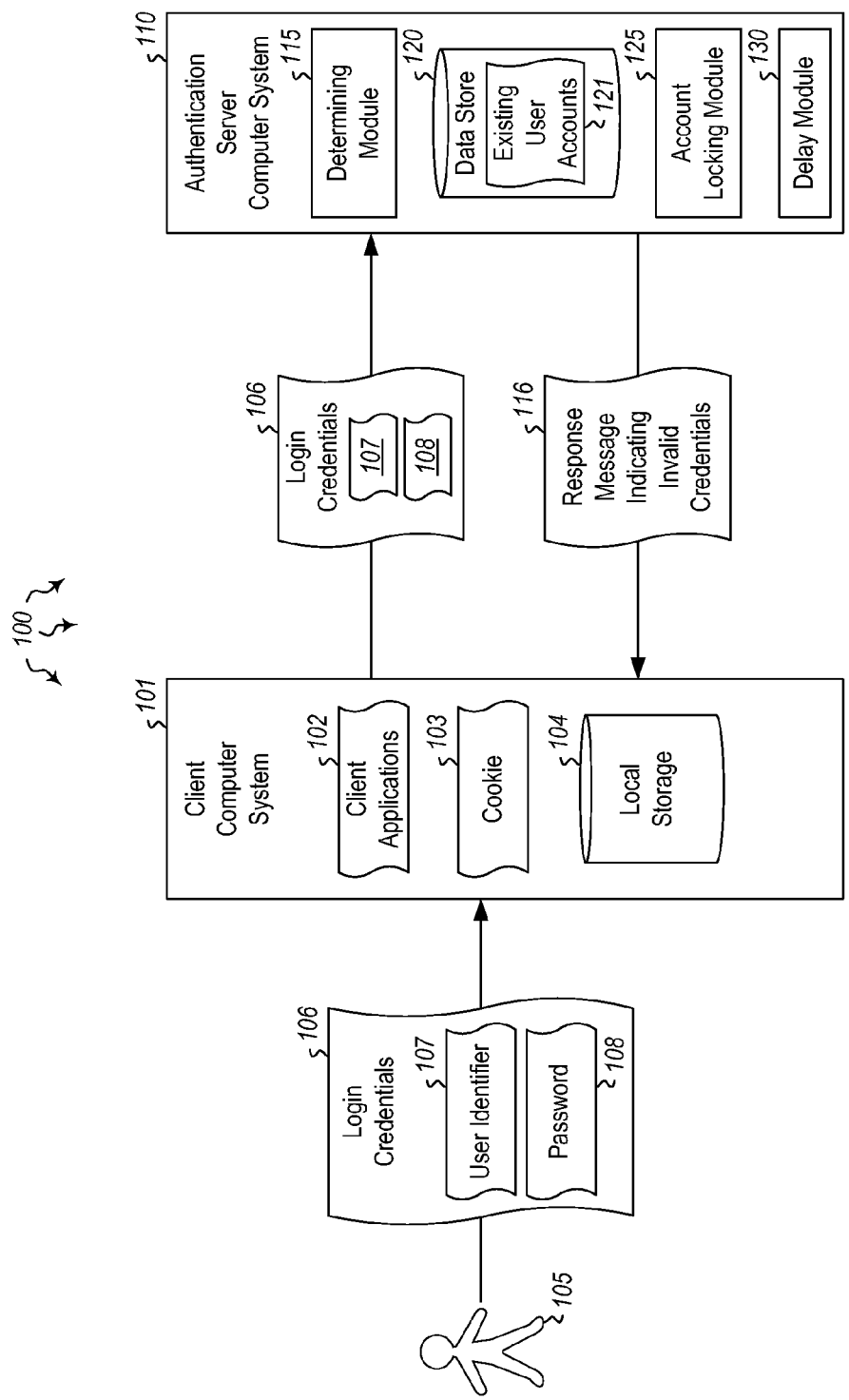
FIG. 1 illustrates a computer architecture in which embodiments of the present invention may operate including efficiently authenticating users while preventing enumeration attacks.

Embodiments described herein are directed to efficiently authenticating users while preventing enumeration attacks and to providing login error messages while preventing enumeration attacks. In one embodiment, an administrative computer system receives user login credentials from a user. These user login credentials may include a user identifier and a password. The administrative computer system then makes at least one of the following determinations: it determines that the user identifier does not match any existing user account, determines that the user identifier matches at least one existing user account, but that the user's account is in a locked state, or determines that the user identifier matches at least one existing user account, but the user's password does not match the user identifier. The administrative computer system then returns to the user the same response message regardless of which determination is made. The response indicates that the user's login credentials are invalid. The response also prevents the user from determining which of the credentials was invalid, as the response message is the same for each determination and is sent to the user after a measured response time that is the same for each determination In another embodiment, a client computer system sends user login credentials from a user to an authentication server. The user login credentials include a user identifier and a password. The authentication server makes at least one of the following determinations: it determines that the user identifier does not match any existing user account, determines that the user identifier matches at least one existing user account, but that the user's account is in a locked state, or determines that the user identifier matches at least one existing user account, but the user's password does not match the user identifier. The client computer system then receives a response message from the authentication server indicating that the user's credentials are invalid. The response message prevents the user from determining which of the credentials was invalid, as the response message is the same for each determination and is received by the user after a measured response time that is the same for each determination.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of local or distributed computer system, including a cloud computing system. The computer system includes client applications 102. These may be any type of software application, including internet browsers or other applications that allow (or require) users to log in to an authentication server. Thus, a user 105 may provide their login credentials 106 to the client application, which passes those credentials on to the authentication server computer system 110. The credentials may include any of a variety of different types of credentials including user identifiers (e.g. user names, email addresses, biometric data, etc.), passwords (including pass phrases, personal identification numbers (PINs), image selection sequences or any other type of pass code) or any other way of identifying and authenticating a user. In the embodiment illustrated in FIG. 1, the user's login credentials include a user identifier 107 and a password 108.

These credentials are sent to the authentication server 110. The authentication server may be any type of local or distributed computer system. It includes a determining module 115 that makes various determinations regarding the user's credentials. For instance, the determining module may determine that the received credentials 106 do not match any existing user accounts 121, or that the user account exists, but the account is in a locked state, or that the user account exists, but the password and identifier do not match. Regardless of which determination is made, the authentication server may send the same response message 116 to the user indicating that the credentials were invalid. This response is sent to the user at the same elapsed time (from the time the credentials are received), regardless of the determination. This prevents the user from determining that the account exists or does not exists based on a quicker or slower response time.

Some embodiments described herein are based on a combination of server-side and client-side methods. This combination of methods may provide the same security benefits as traditional CAPTCHAs (Completely Automated Public Turing tests to tell Computers and Humans Apart) or throttling implementations, while preventing enumeration risk. As used herein, an "enumeration risk" refers to the possibility that a malicious user will try different user name and password combinations to determine if the account is valid. If the malicious user can determine that the account is valid, the user can then use other techniques to crack or otherwise discover the user's password.

The authentication server 110 is designed to provide the same (or substantially the same) response message with the same (or substantially the same) content to the client regardless of whether it is a good user with bad password or a non-existing user. The messages are also sent to the user after the same amount of elapsed time since receiving the user's credentials. In this manner, the malicious user cannot gain knowledge from the response that would aid the malicious user in his or her attack. A client-side control is used to mitigate the message to the user 105. This prevents even an attacker performing a distributed attack from multiple internet protocol addresses (IPs) (or through automation) from gaining knowledge about the authentication server's user accounts 121.

Each time a user attempts to log in to the authentication server, the login will either succeed (in which the user is granted access to one or more specified system features) or fail. In cases where the login fails, a counter may be incremented to keep track of the number of login failures. This counter may be a lifetime counter, or the counter may be reset after a certain amount of time (e.g. 30 min). Thus, if a user fails to login after a certain specified number of attempts (e.g. three), then the user's account will be put in "temporary locked" state. This locked state will prevent the user from logging in for a certain amount of time. The number of login attempts before lockdown, the number of minutes for resetting the counter, the number of minutes for a given lockdown and other settings may be customized and specified by an administrative user.

Each time a failed login attempt occurs, a response message 116 is sent to the user 105 indicating that the user's credentials are invalid. The message may say, for example, "Bad username or password". In some embodiments, a client's login attempts may be throttled by the client computer system 101 (without using a CAPTCHA). The client computer system may create its own counter, for example, in a cookie 103. This cookie may be created (for each user) at the user's first failed login attempt. It may then be incremented by one at each subsequent failed login attempt. This is performed for both existing and non-existing users. The same error message is provided for bad password and for non-existing usernames. When the counter reaches a certain value, software functionality executing locally on the client computer system may display the following in place (e.g. on an internet browser's login page) or in addition to the response message: "Your account may have been locked out. Try again in 5 minutes". Once the user has logged in successfully, the counter is reset or the cookie is simply deleted.

On the client side, the counter may be implemented in various ways, including using cookies and hypertext markup language (HTML) local storage. If using cookies, the counter may be implemented solely from the client side. For instance, the client computer system may read and write cookies and increment the counter each time the user has submitted login credentials and has failed to log in. This eliminates server side processing of the values of the cookie. Depending on browser capability, the counter may also be implemented with HTML local storage. Client-side management of the cookie may prevent an attacker from gaining knowledge about the account. For example, client-side cookie management may prevent the attacker from learning that the account has been locked out by looking at the cookie in the HTTP response. The client computer system may implement script code running in a browser, or a rich client application. These concepts will be explained further below with regard to methods 200 and 300 of FIGS. 2 and 3, respectively.

Figure 2:
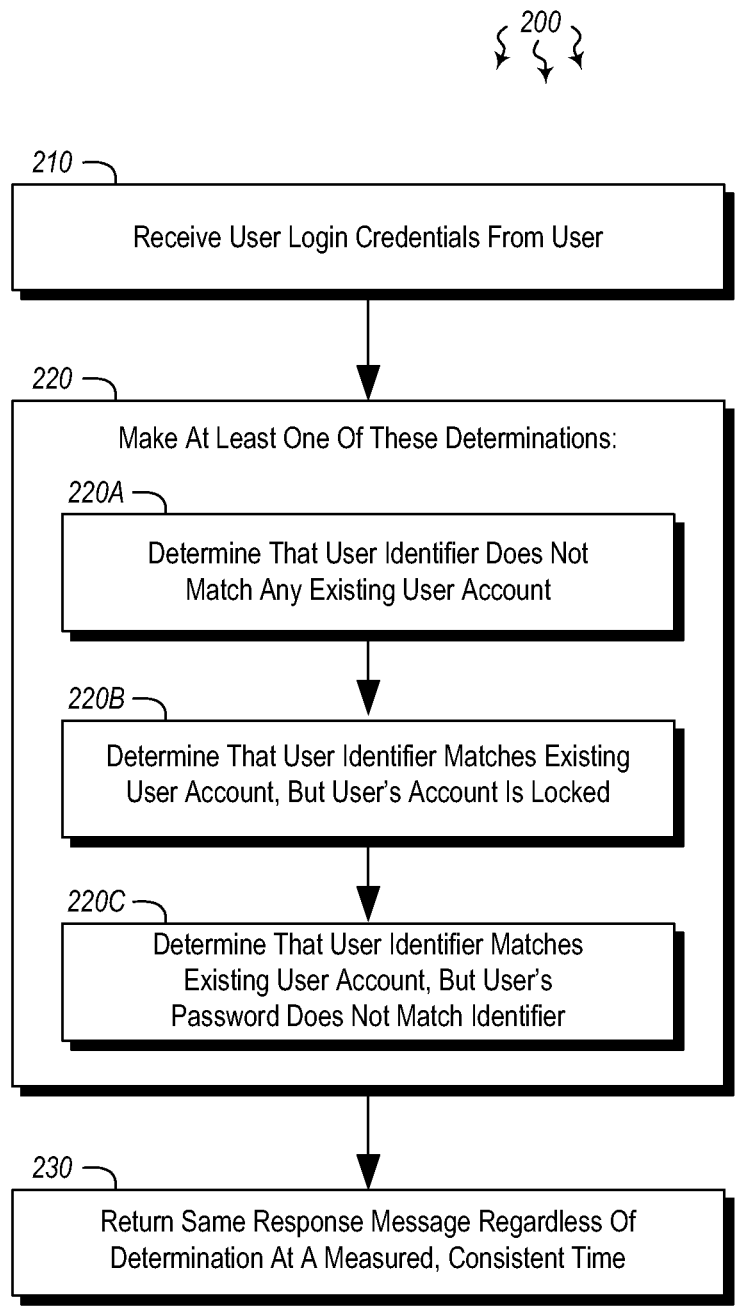
FIG. 2 illustrates a flowchart of an example method for efficiently authenticating users while preventing enumeration attacks.
Figure 3:
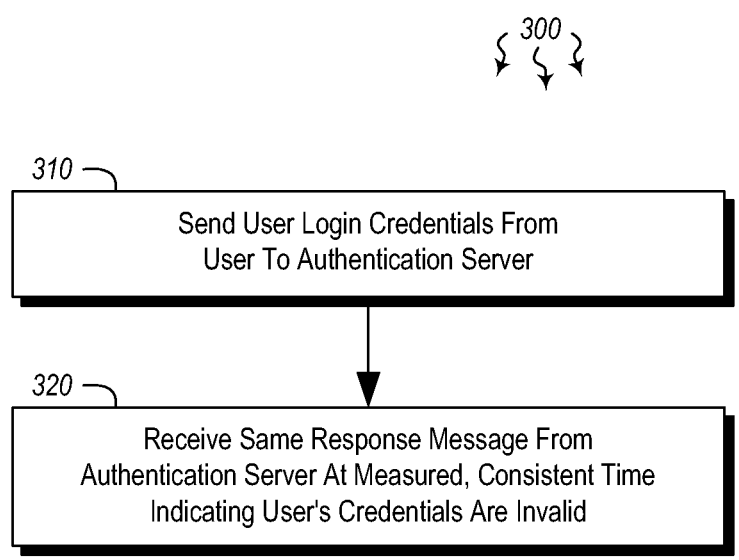
FIG. 3 illustrates a flowchart of an example method for providing login error messages while preventing enumeration attacks.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for efficiently authenticating users while preventing enumeration attacks. The method 200 will now be described with frequent reference to the components and data of environments 100 and 400 of FIGS. 1 and 4, respectively.

Figure 4:
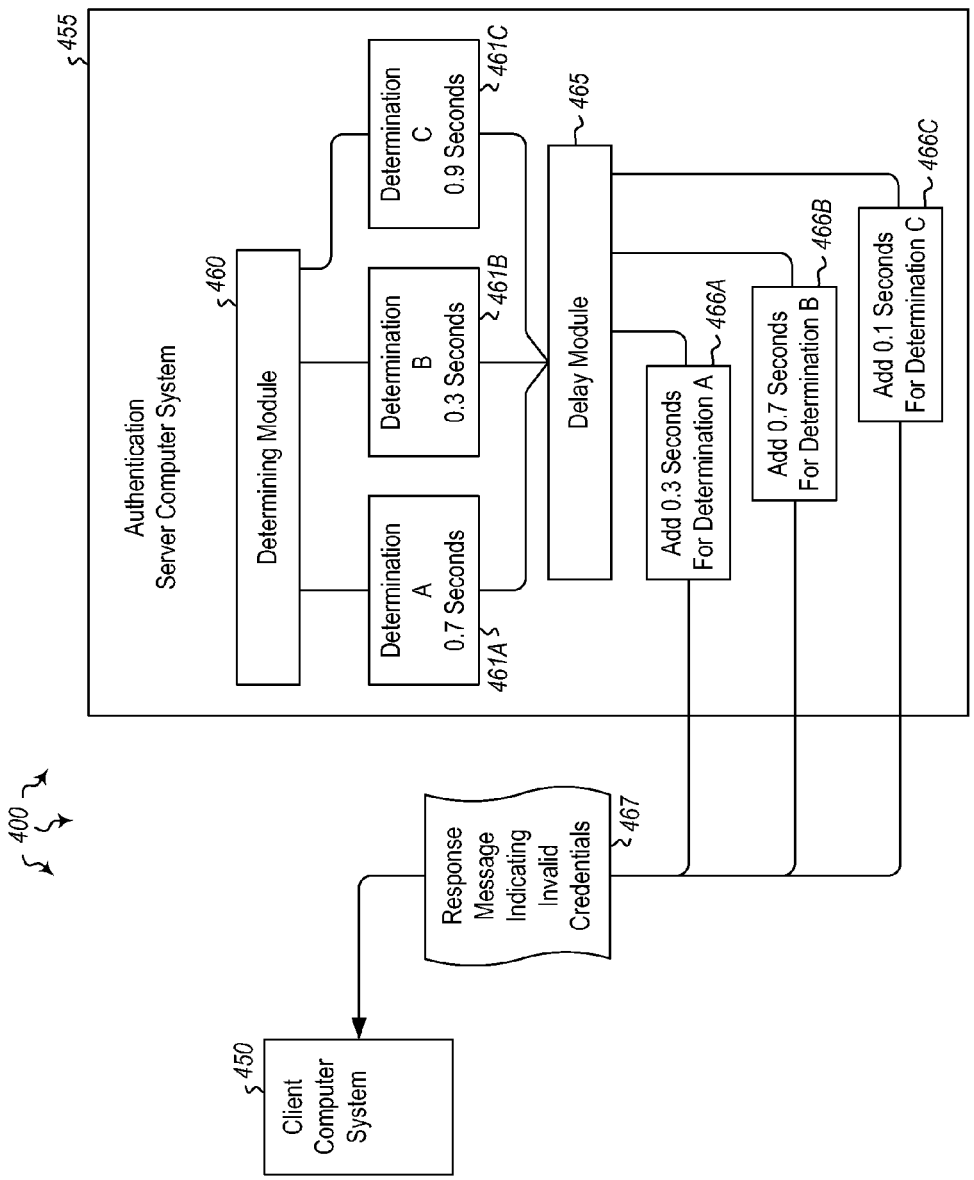
FIG. 4 illustrates an embodiment of the present invention in which error messages are provided while preventing enumeration attacks.

Method 200 includes an act of receiving user login credentials from a user, the user login credentials including a user identifier and a password (act 210). For example, authentication server computer system 110 may receive login credentials 106. These login credentials may include any type or combination of user identifiers 107 and passwords 108 or pass phrases. The authentication server may then make any one or more of the following determinations (as shown in FIG. 4): determination A (461A) which determines that the user identifier does not match any existing user account (act 220A). In such cases, the user identifier (e.g. user name, email address, biometric data identifying the user, etc.) does not match any existing user accounts 121 stored in the authentication server's data store 120.

Additionally or alternatively, the determining module 115 of the authentication server 110 may make determination B (461B) which indicates that the user identifier matches at least one existing user account 121, but the user's account is in a locked state (act 220B). For example, if a user has had more than a certain number of failed login attempts within a certain period of time, the account locking module 125 of the authentication server will lock the user's account and prevent successful logins for that user for a specified amount of time (i.e. until the account is unlocked). Once the user's account is unlocked, the user will be able to login in if he or she supplies the proper, valid credentials.

Still further, the determining module 115 of the authentication server 110 /may make determination C (461C) indicating that the user identifier 107 matches at least one existing user account 121, but the user's password 108 does not match the user identifier (act 220C). Thus, in such cases, the account corresponding to the supplied user identifier does exist, but the supplied password does not match. Accordingly, the user will be prevented from logging in, and response message 116 will be sent.

The authentication server computer system 110 returns to the user the same response message regardless of which determination (A, B or C) is made (act 230). The response message indicates that the user's login credentials are invalid. The response message does not supply extraneous details indicating why the credentials are invalid—only that either or both of the user identifier and the password were incorrect. The response message 116 prevents malicious users from determining which of the credentials was invalid, as the response message is the same for each determination. Moreover, the response is sent to the user after a measured response time that is the same for each determination (act 230).

Thus, for example, delay module 130 may generate and apply a delay to each response message 116 to ensure that each response message is sent to the user after the same amount of time has elapsed since the user's login credentials were received. Thus, as shown in FIG. 4, if determining module 460 of authentication server 455 takes 0.7 seconds to make determination A, and the total elapsed time from receiving the credentials to providing the response message is to be 1.0 seconds, the delay module 465 may add a 0.3 second delay 466A to the response message 467 before it is sent to the client computer system 450. Similarly, if determining module 460 takes 0.3 seconds to make determination 461B, the delay module will add a 0.7 second delay 466B, and if determination C 461C takes 0.9 seconds, a 0.1 second delay 466C will be added before sending the response message. Thus, it can be seen that the same message will be sent regardless of which determination is made, and that the response message will be sent at (substantially) the same time. It will be understood by one skilled in the art that the times mentioned above are arbitrary, and than any other delay or queuing system may be used to ensure that the messages are sent out after the same elapsed time.

Moreover, it will be understood that the length of the delay applied by the delay module 465 is variable and is dynamically generated for each login attempt. This ensures that each response is sent after the same amount of time has elapsed since the user's login credentials were received. The response messages are stored without storing state information for non-existing accounts. Thus, the authentication server system does not have to store or maintain state information for user names or other identifiers that do not match existing user accounts 121.

As mentioned above, the number of failed login attempts may be tracked by the authentication server for each user (e.g. user 105). The authentication server may determine that the number of failed login attempts is greater than a predefined maximum number. As a result, the account locking module 125 may place the user's account in a locked state for a specified amount of time. During this time, the user is prevented from logging in. Once a specified amount of time has elapsed, the user's account will be unlocked and the user will be able to log in. If the user attempts to log in with invalid credentials and the number of failed login attempts is not greater than the predefined maximum number, the authentication server will increment a failed login attempt counter associated with the user by one and provide the response message 116. The user (or attacker) will not see any difference when the counter reaches the predefined maximum number value and the account gets locked out (the same ambiguous response will be returned either way). The server internally locks the user account, and the user has no knowledge that it happened. These account locking elements may additionally or alternatively be performed by the client computer system, as will be explained below with regard to method 300 of FIG. 3.

FIG. 3 illustrates a flowchart of a method 300 for providing login error messages while preventing enumeration attacks. The method 300 will now be described with frequent reference to the components and data of environment 100.

Method 300 includes an act of sending user login credentials from a user to an authentication server, the user login credentials including a user identifier and a password (act 310). For example, client computer system 101 may receive login credentials 106 including user identifier 107 and password 108 from user 105. The client computer system may then send these credentials to authentication server computer system 110. These credentials may be received from the user and sent via a client application 102 such as an internet browser.

The authentication server 110 makes at least one of the following determinations: it determines that the user identifier 107 does not match any existing user account 121, it determines that the user identifier matches at least one existing user account, but that the user's account is in a locked state, or it determines that the user identifier matches at least one existing user account, but the user's password does not match the user identifier. Then, regardless of which determination was made by the authentication server, the client computer system receives a response message from the authentication server indicating that the user's credentials are invalid (act 320). The response message 116 prevents the user from determining which of the credentials was invalid, as the response message is the same for each determination and is received by the user after a measured response time that is the same for each determination (act 320). As indicated above, a delay may be applied to each response message to ensure that the same amount of elapsed time is spent for each login request.

The client computer system 101 may be used (solely, or in addition to authentication server 110) to track the user's failed login attempts. A cookie 103 may be created on the client computer system to track one or more portions of information associated with the user's login attempts. This information associated with the user's login attempts may include a failed login attempt counter. The client computer system may access the counter in the cookie to determine whether the number of failed login attempts is greater than a predefined maximum number. If the number of failed login attempts is not greater than a predefined maximum number, the failed login attempt counter will be incremented by one. As such, the processing of the cookie on the client computer system may prevent any processing of the cookie by the authentication server.

In some cases, the client computer system may access the cookie 103 to determine whether the number of failed login attempts is greater than a predefined maximum number. And, upon determining that the number of failed login attempts is greater than a predefined maximum number, the client computer system may display a message to the user 105 indicating that the user's account has been locked out.

In another embodiment, a failed login attempt counter may be stored in hypertext markup language (HTML) local storage 104 on the client computer system 101. The client computer system may access this failed login attempt counter in the HTML local storage to determine whether the number of failed login attempts is greater than a predefined maximum number. If it determines that the number of failed login attempts is not greater than a predefined maximum number, the failed login attempt counter in the HTML local storage may be incremented by one. If the client computer system accesses the failed login attempt counter in the HTML local storage and determines that the number of failed login attempts is greater than a predefined maximum number, the client computer system may display a message to the user indicating that the user's account has been locked out and/or that the user can attempt to log in at a later time.

Accordingly, methods, systems and computer program products are provided which efficiently authenticate users while preventing enumeration attacks. Response messages are sent after the same elapsed time, and the same response messages are sent regardless of whether the identified account does not exist, whether the account is locked or whether the user name and password do not match. In this manner, a user is provided with information indicating that the credentials supplied are invalid, but does not provide a malicious user with information that could be used in an enumeration attack.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At an authentication server computer system including at least one processor and a memory, in a computer networking environment including a plurality of computing systems, a computer-implemented method for efficiently authenticating users while preventing enumeration attacks, the method comprising:

an act of receiving user login credentials from a user at a specified time, the user login credentials including a user identifier and a password;

an act of the processor making at least one of the following determinations:

determining that the user identifier does not match any existing user account;

determining that the user identifier matches at least one existing user account, but the user's account is in a locked state; and determining that the user identifier matches at least one existing user account, but the user's password does not match the user identifier;

an act of generating a variable delay based on the time the login credentials were received at the authentication server computer system, the generated delay accounting for the amount of time taken by the processor to make the at least one determination, the generated delay ensuring that each response message is returned to the user at substantially the same elapsed time since the user's login credentials were received, regardless of which determination was made, the length of the delay is variable and is dynamically generated for each login attempt to ensure that each response is sent after the same amount of time has elapsed since the user's login credentials were received; and upon application of the generated delay, an act of returning to the user the same response message regardless of which determination is made, the response message indicating that the user's login credentials are invalid, wherein the response message prevents the user from determining which of the credentials was invalid, as the response message is the same for each determination and is sent to the user after a measured response time that is the same for each determination.

2. The method of claim 1, wherein the response messages are stored without storing state information for non-existing accounts.

3. The method of claim 1, further comprising tracking the number of failed login attempts for each user.

4. The method of claim 3, further comprising:

an act of determining that the number of failed login attempts is greater than a predefined maximum number; and an act of placing the user's account in a locked state for a specified amount of time, wherein the user is prevented from logging in while the user's account is in the locked state.

5. The method of claim 3, further comprising:

an act of determining that the number of failed login attempts is not greater than a predefined maximum number; and an act of incrementing a failed login attempt counter associated with the user by one, wherein the user is not informed of the incremented counter and wherein the user's account is locked upon the failed login attempt counter reaching a predefined maximum value.

6. At a client computer system including at least one processor and a memory, in a computer networking environment including a plurality of computing systems, a computer-implemented method for providing login error messages while preventing enumeration attacks, the method comprising:

an act of the processor sending user login credentials from a user to an authentication server at a specified time, the user login credentials including a user identifier and a password, the authentication server making at least one of the following determinations:

determining that the user identifier does not match any existing user account;

determining that the user identifier matches at least one existing user account, but the user's account is in a locked state; and determining that the user identifier matches at least one existing user account, but the user's password does not match the user identifier; and an act of receiving a response message from the authentication server indicating that the user's credentials are invalid, the authentication server having generated a variable delay based on the time the login credentials were received at the authentication server, the generated delay accounting for the amount of time taken by the authentication server to make the at least one determination, the generated delay ensuring that each response message is returned to the user at the same elapsed time since the user's login credentials were received, regardless of which determination was made, wherein the length of the delay is variable and is dynamically generated for each login attempt to ensure that each response is sent after the same amount of time has elapsed since the user's login credentials were received; and wherein the response message prevents the user from determining which of the credentials was invalid as the response message is the same for each determination and is received by the user after a measured response time that is the same for each determination.

7. The method of claim 6, wherein a cookie is created on the client computer system to track one or more portions of information associated with the user's login attempts.

8. The method of claim 7, wherein at least one of the portions of information associated with the user's login attempts comprises a failed login attempt counter.

9. The method of claim 8, further comprising:
an act of accessing the cookie on the client computer system to determine whether the number of failed login attempts is greater than a predefined maximum number; and
upon determining that the number of failed login attempts is not greater than a predefined maximum number, an act of incrementing the failed login attempt counter by one.

10. The method of claim 9, wherein the processing of the cookie on the client computer system prevents the user from gaining knowledge that the account has been locked out by looking at the cookie in the response message.

11. The method of claim 8, further comprising:
an act of accessing the cookie on the client computer system to determine whether the number of failed login attempts is greater than a predefined maximum number; and
upon determining that the number of failed login attempts is greater than a predefined maximum number, an act of displaying a message to the user indicating that the user's account has been locked out.

12. The method of claim 6, wherein a failed login attempt counter is stored in hypertext markup language (HTML) local storage on the client computer system.

13. The method of claim 12, further comprising:
an act of accessing the failed login attempt counter in the HTML local storage to determine whether the number of failed login attempts is greater than a predefined maximum number; and
upon determining that the number of failed login attempts is not greater than a predefined maximum number, an act of incrementing the failed login attempt counter in the HTML local storage by one.

14. The method of claim 12, further comprising:
an act of accessing the failed login attempt counter in the HTML local storage to determine whether the number of failed login attempts is greater than a predefined maximum number; and
upon determining that the number of failed login attempts is greater than a predefined maximum number, an act of displaying a message to the user indicating that the user's account has been locked out.

15. A computer system comprising the following: one or more processors; system memory; one or more computer-readable storage media having stored thereon computer-executable instructions that, when executed by the one or more processors, causes the computing system to perform a method for efficiently authenticating users while preventing enumeration attacks, the method comprising the following:
an act of receiving user login credentials from a user at a specified time, the user login credentials including a user identifier and a password;
an act of making at least one of the following determinations:
determining that the user identifier does not match any existing user account;
determining that the user identifier matches at least one existing user account, but the user's account is in a locked state; and
determining that the user identifier matches at least one existing user account, but the user's password does not match the user identifier;
an act of generating a variable delay based on the time the login credentials were received at the computer system, the generated delay accounting for the amount of time taken to make the at least one determination, the generated delay ensuring that each response message is returned to the user at substantially the same elapsed time since the user's login credentials were received, regardless of which determination was made, wherein the length of the delay is variable and is dynamically generated for each login attempt to ensure that each response is sent after the same amount of time has elapsed since the user's login credentials were received; and
upon application of the generated delay, an act of returning to the user the same response message regardless of which determination is made, the response indicating that the user's login credentials are invalid, wherein the response message prevents the user from determining which of the credentials was invalid as the response message is the same for each determination and is sent to the user after a measured response time that is the same for each determination.

16. The computer system of claim 15, further comprising:
an act of tracking the number of failed login attempts for each user;
an act of determining that the number of failed login attempts is greater than a predefined maximum number; and
an act of placing the user's account in a locked state for a specified amount of time, wherein the user is prevented from logging in while the user's account is in the locked state.

17. The computer system of claim 15, further comprising:
an act of tracking the number of failed login attempts for each user;
an act of determining that the number of failed login attempts is not greater than a predefined maximum number; and
an act of incrementing a failed login attempt counter associated with the user by one.

* * * * *